United States Patent [19]

Mori et al.

[11] Patent Number: 4,787,736
[45] Date of Patent: Nov. 29, 1988

[54] LASER CLAD VALVE FOR INTERNAL COMBUSTION ENGINE

[75] Inventors: Kazuhiko Mori; Katsuhiko Ueda; Soya Takagi, all of Toyota; Isao Torii; Shigeki Yamada, both of Obu, all of Japan

[73] Assignees: Toyota Jidosha Kabushiki Kaisha; Aisan Kogyo Kabushiki Kaisha, both of Aichi, Japan

[21] Appl. No.: 61,550

[22] Filed: Jun. 15, 1987

[51] Int. Cl.⁴ .............................................. F01L 3/00
[52] U.S. Cl. ............................ 251/368; 29/156.7 R; 123/188 AA
[58] Field of Search ............... 251/368; 123/188 AA; 29/156.7 R

[56] References Cited

U.S. PATENT DOCUMENTS

| | | | |
|---|---|---|---|
| 3,147,747 | 9/1964 | Kittelson | 123/188 AA |
| 4,122,817 | 10/1978 | Matlock | 123/188 AA |
| 4,182,299 | 1/1980 | Earle et al. | 123/188 AA |
| 4,529,169 | 7/1985 | Johns et al. | 123/188 AA |

Primary Examiner—A. Michael Chambers
Attorney, Agent, or Firm—Parkhurst, Oliff & Berridge

[57] ABSTRACT

In an engine valve comprising a valve body of an iron base material, a Stellite or similar alloy is clad on the body using a laser beam with a sufficient energy to form a cladding layer as a valve face such that the iron from the body-forming iron base material is diffused into the cladding layer throughout its thickness through an interface layer between the cladding layer and the valve body, whereby the cladding layer has 5 to 15 wt % of iron diffused and the interface layer has an iron content continuously decreasing from the iron content of the body-forming iron base material to that of the cladding layer.

5 Claims, 9 Drawing Sheets

LASER CLAD VALVE FOR INTERNAL COMBUSTION ENGINE

BACKGROUND OF THE INVENTION

This invention relates to a valve suitable for use in internal combustion engines such as automobile Diesel engines. More particularly, it relates to a clad valve prepared using a laser beam as a heating source for cladding.

Intake and exhaust valves for use in automobile engines are valves for governing intake and exhaust cycles in a combustion chamber consisting of a head and a stem extending therefrom. The head of the engine valve is located inside the combustion chamber and has a face (referred to as valve face, hereinafter) adapted to be repeatedly brought into and out of sealing engagement with a valve seat in a cylinder head during operation of the engine. The valve face must have excellent heat resistance (precisely, thermal shock resistance), corrosion resistance (precisely, resistance against oxidation at high temperatures), and abrasion resistance because it is exposed to a corrosive atmosphere at high temperatures of about 700° to about 800° C. and experiences a mechanical shock by the valve seat.

In order that such properties be imparted to the valve face of engine valves, it is well known in the art to clad on a valve head parent material such as iron base material, typically stainless steel a material different from the parent material and having higher resistance against abrasion, heat and corrosion than the parent material, such as cobalt base superalloy, typically Stellite to form a cladding layer which constitutes the valve face. The main stream of the prior art technique for cladding Stellite or similar alloy on a valve face is a gas welding or cladding technique using a mixture of oxygen and acetylene gas. Because of the low density and difficulty of precise control of energy introduced during cladding, the gas cladding technique inevitably results in an increased cladding thickness, increasing the cost. Additionally, finish processing after cladding undesirably requires a considerable amount of labor and time. The cladding layer by the gas cladding technique tends to form defects such as pinholes due to inclusion of gas, yielding an increased proportion of rejected parts. Because of low energy density, the gas cladding technique suffers from a slow cladding speed and inefficient operation and requires pre- or post-heating.

Laser is known to be characterized by a high energy density, ease of control, and possible limitation of heating area. It is thus believed that the problems associated with the gas welding can be solved to a certain extent by carrying out cladding using a laser beam as a heating source. In fact, there is the increasing tendency of applying a laser cladding method instead of the gas welding in cladding of engine valves with Stellite or similar alloy. A typical example is disclosed by M. Earle et al, U.S. Pat. No. 4,182,299 entitled Engine Valve.

The engine valve of Earle et al. comprises a valve head of an alloy steel base material. A metallic alloy material different than the alloy steel such as Stellite is fusibly bonded to the head by a beam of electromagnetic energy, typically a laser beam to form a valve seat layer which corresponds to the valve face described above. In this engine valve, there is an interstitial bond region of about 0.003 inches (0.075 mm) thick between the head of alloy steel base material and the valve seat layer of the cladding metal, defining a relatively abrupt descendency of the relative concentration of iron from the amount present in the alloy steel base material toward a negligible amount in the valve seat layer. From the disclosure of Earle et al. Patent including the definition of the interstitial bond region and the figures illustrating iron distribution, it is supposed that the diffusion of iron, the major component of the alloy steel base material is limited substantially up to the interstitial bond region and does not reach the valve seat layer. Differently stated, the Stellite or similar cladding metal of the valve seat layer is not substantially diluted with the iron from the alloy steel base material.

In engine valves having Stellite clad by the laser cladding technique, it is believed advantageous that the cladding layer is not substantially diluted with the iron of the parent material because the quality of Stellite remains unchanged without dilution with iron. It is believed that the Stellite cladding layer without dilution with iron can exert Stellite's own characteristics to a full extent. However, we have found that engine valves whose cladding layer of Stellite is not diluted with the iron of the parent material suffer from several problems.

First, there is the likelihood that slack bonds like cavities would often occur between the cladding layer and the parent material to form a somewhat weak bond. Many such valves cannot be incorporated in engines for actual service. The likelihood of slack bonding is more frequent than with the engine valves formed by the conventional gas welding technique in which the cladding layer is diluted with components of the parent material to a certain extent. Pinholes in the cladding layer are fewer than with the gas welding technique, but not fully minimized. With respect to the properties of the cladding layer, engine valves having a Stellite cladding layer formed by laser cladding without dilution with the iron of the parent material exhibits a higher attack against the mating member, that is, valve seat than available with the Stellite cladding layer formed by the gas welding technique. The former exhibits a lower thermal shock resistance than the latter, indicating the probable occurrence of cracks during thermal cycles in service.

SUMMARY OF THE INVENTION

Therefore, an object of the present invention is to provide an engine valve of quality having a valve face portion formed by cladding an abrasion resistant alloy such as Stellite to an iron base body material using a laser beam as a heating source without leaving slack bonds between the cladding layer and the body material.

Another object of the present invention is to provide a clad valve having a cladding layer with minimized pinholes.

A further object of the present invention is to provide a clad valve having reduced attack to the mating member while maintaining thermal shock resistance.

A still further object of the present invention is to reduce the thickness of the cladding layer for economic reason.

The present invention provides a valve comprising a valve body of an iron base material such as austenitic or martensitic heat-resistant steel and a valve face portion in the form of a cladding layer formed by laser cladding on said valve body an alloy having higher abrasion resistance and heat resistance than the iron base material, such as Stellite. According to the feature of the present invention, the cladding layer has 5 to 15% by weight of the iron from the body-forming iron base material diffused therein throughout the thickness thereof, and the iron from the body-forming iron base material is diffused in an interface layer between the cladding layer and the valve body such that the iron content continuously decreases from the iron content of the body-forming iron base material to that of the cladding layer in a thickness direction.

BRIEF DESCRIPTION OF THE DRAWINGS

The above and other objects, features, and advantages of the present invention will be more fully understood from the following description taken in conjunction with the accompanying drawings, in which.

DETAILED DESCRIPTION OF THE INVENTION

Figure 1:
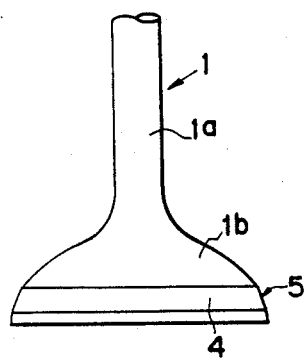
FIG. 1 is a side elevation of a laser clad valve according to the present invention.
Figure 2:
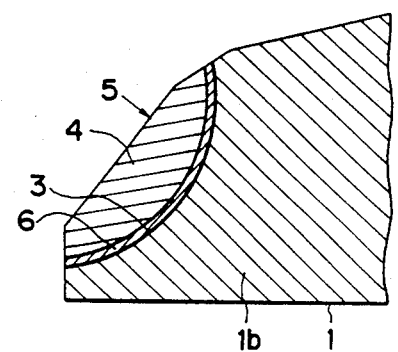
FIG. 2 is a cross-sectional view of a valve face portion of the laser clad valve.

Referring to FIG. 1, there is schematically illustrated a valve according to one embodiment of the present invention. FIG. 2 illustrates in an enlarged cross-sectional view a major portion of the valve including a valve face portion with a cladding material built-up.

A valve body 1 is of ordinary structure and includes a valve stem 1a and a valve head 1b. An annular portion of the head 1b which constitutes a valve face or is adapted to engage a valve seat (not shown) in an intake or exhaust port in internal combustion engines is provided with a circumferentially extending recess 3 which is of concave arch shape in cross section as shown in FIG. 2. A circumferentially extending cladding layer 4 is formed in the recess 3 with the surface thereof presenting a valve face 5. Between the cladding layer 4 and the body 1 is an interface layer 6 which also extends circumferentially and of an arch shape in cross section.

Figure 3:
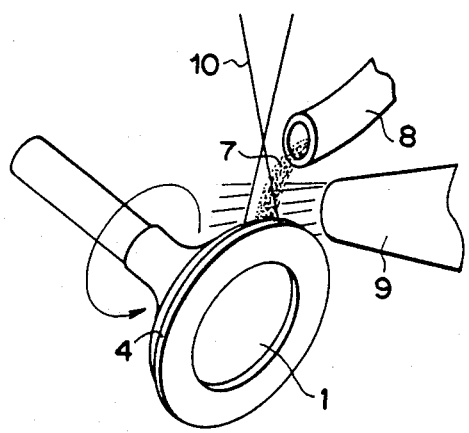
FIG. 3 schematically illustrates a process of laser cladding alloy on a valve according to the present invention.

The cladding layer 4 is formed by a cladding technique using a laser beam, that is, laser cladding. One typical procedure is shown in FIG. 3. The valve body 1 having the recess 3 preformed therein is held with its axis at an angle with respect to a vertical direction. Disposed above the recess 3 is a nozzle 8 for delivering a powder cladding alloy 7 to the recess. While the valve body 1 is rotated about its axis at a predetermined circumferential speed, the powder cladding alloy 7 is continuously delivered from the nozzle 8 to the recess 3 where it is exposed to a laser beam concurrently with delivery. A shielding gas such as argon gas is fed from a shield gas nozzle 9. At the same time, a laser beam 10 is directed to a settling deposit of the powder cladding alloy 7 in the recess 3. By virtue of irradiation of laser beam and rotation of the valve body, the powder cladding alloy is quickly heated and melted and then cooled and solidified to form a cladding layer 4.

The valve body 1 is formed of an iron base material including alloy steel base materials commonly used as valve material in the art. Examples of the iron base materials include austenite heat-resistant steels, for example, SUH 31 (15Cr-14Ni-2.5W), SUH 35 (21Cr-3.75Ni-0.45N), SUH 36 (21Cr-3.75Ni-0.45N-high S), SUH 37 (21.5Cr-11Ni-0.25N) and SUH 38 (20Cr-11Ni-2.3Mo-B) as prescribed in JIS Standard, and martensite heat-resistant steels, for example, SUH 1 (8.5Cr), SUH 3 (11Cr-1Mo), SUH 4 (20Cr-1.5Ni) and SUH 11 (8.5Cr-low Si) as prescribed in JIS Standard, and other stainless steels. In general, austenite heat-resistant steels are often used for exhaust valves while martensite heat-resistant steels are often used for intake valves.

The cladding layer 4 is formed of a cladding alloy which has higher abrasion resistance and heat resistance than the iron base material of the valve body 1. Examples of the cladding alloys include cobalt base superalloys, typically Co-Ni-W-Cr superalloys such as Stellite and nickel base superalloys, typically Ni-Cr-Mo superalloys, with Stellite alloys being preferred. Among various known types of Stellite, most preferred Stellite is Stellite No. 32 which consists essentially of, in % by weight, 1.5–2.0% of C, 0.9–1.3% of Si, 24–32% of Cr, 11.5–13.0% of W, 21.0–23.0% of Ni, balance of Co with Fe being limited to at most 2.0% and Mn being limited to at most 0.3%. Preferred nickel base superalloys are those consisting essentially of, in % by weight, 14–23% of Cr, 5–16% of Mo, less than 1.5% of Co, less than 4.0% of W, less than 5.0% of Fe, less than 0.8% of Si, less than 1.0% of Mn, 0.05-0.1% of C, 0.1-2.0% of Ca, balance being Ni; and those consisting essentially of, in % by weight, 18-22% of Cr, 3-6% of Mo, less than 5.0% of Co, less than 4.0% of Fe, less than 1.0% of Si, less than 1.0% of Mn, 0.05-0.1% of C, 0.1-2.0% of Ca, less than 1.0% of Al, balance being Ni.

Although the clad valve of the present invention is prepared using Stellite or similar alloy as the cladding alloy, the resultant cladding layer 4 itself does not maintain unchanged the composition of the cladding alloy used, but a composition changed essentially by having diffused therein predominantly the iron from the iron base material of the valve body 1. Iron (Fe) migrates or diffuses from the valve body to the cladding layer during the laser cladding process. Namely, the cladding layer 4 has the composition of the cladding alloy (e.g. Stellite) diluted with iron from the valve body (e.g. alloy steel) due to diffusion. The amount of iron diffused into the cladding layer from the body ranges from 5% to 15% by weight of the cladding layer. In general, the cladding alloy such as Stellite originally has a very low content of iron. In case the amount of iron originally contained in the cladding alloy is as low as negligible, it is regarded that the above-requirement of the diffused iron content is met when the total iron content in the cladding layer is substantially in the range of 5 to 15% by weight. The interface layer 6 between the cladding layer 4 and the body 1 is a transition resulting from mixing of the iron base material of the body and the Stellite or superalloy of the cladding layer. The iron content of the interface layer 6 continuously decreases from the iron content of the body to that of the cladding layer in a direction from the body toward the cladding layer.

Figure 4:
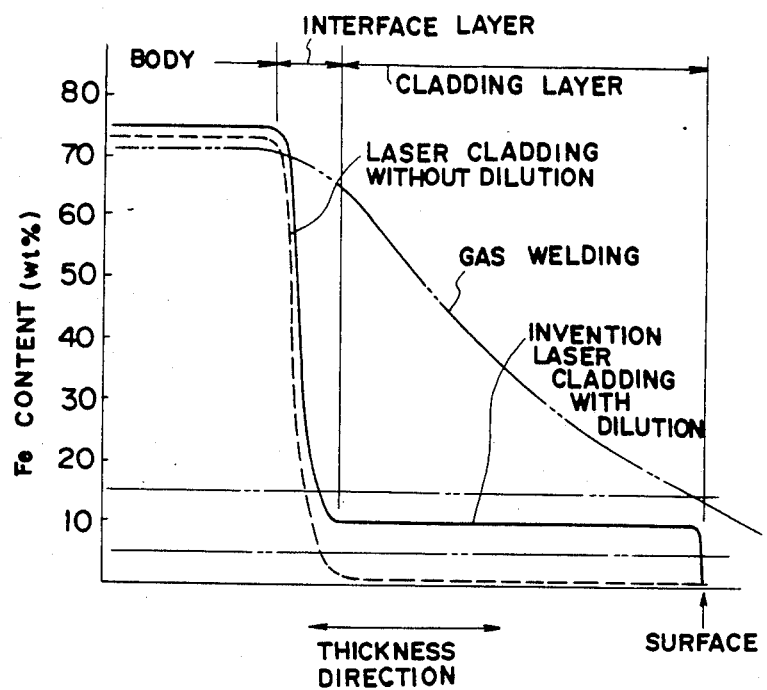
FIG. 4 is a graph showing the profile of iron content in a thickness direction of a valve face portion of the laser clad valve of the present invention in comparison with those of other valves.

An iron profile is diagrammatically shown in FIG. 4 in which the iron content on the ordinate is plotted in a thickness direction of the cladding layer or valve face portion on the abscissa. The thickness direction used herein is a direction substantially perpendicular to the solid line indicative of the outer surface of the cladding layer 4 in the cross section of FIG. 2. It is assumed that the cladding alloy itself has an original iron content substantially equal to zero. The body has an iron content of about 70 to 80% by weight although the exact content varies with a particular type of iron base material used. As shown by a solid curve corresponding to a laser cladding technique with iron diffusion according to the present invention, the iron content is about 75% in the body region, continuously decreases through the interface layer, and then is about 10% in the cladding layer region (these values are given only for the purpose of description). Iron is diffused into the cladding layer through the interface layer and present in the cladding layer in an amount of 5 to 15% by weight. The amount of iron diffused in the cladding layer is substantially constant in a thickness direction up to its surface. For comparison purposes, a broken line curve is shown as representing a laser cladding technique without substantial diffusion of iron into the cladding layer, that is, the technique of Earle et al, U.S. Pat. No. 4,182,299. A gas cladding technique is shown by a dot-and-dash line curve. In the case of gas cladding, significant dilution of the cladding layer with iron occurs, but the degree of dilution progressively decreases toward the cladding layer surface.

It is contrary to the prior art knowledge of laser clad valves described in the preamble to ensure that iron from the body material be diffused into the cladding layer and as a result, the cladding alloy be diluted with iron from the body material. Quite surprisingly, the laser clad valve of the present invention in which iron from the body material is positively diffused into the cladding layer is characterized by a significantly reduced frequency of generating slack bonds where the cladding layer remains locally unbonded to the body (slack bonding rate), minimized occurrence of pinholes, mitigated attack to a member to be mated therewith, and improved thermal shock resistance for the reason described below.

Figure 5:
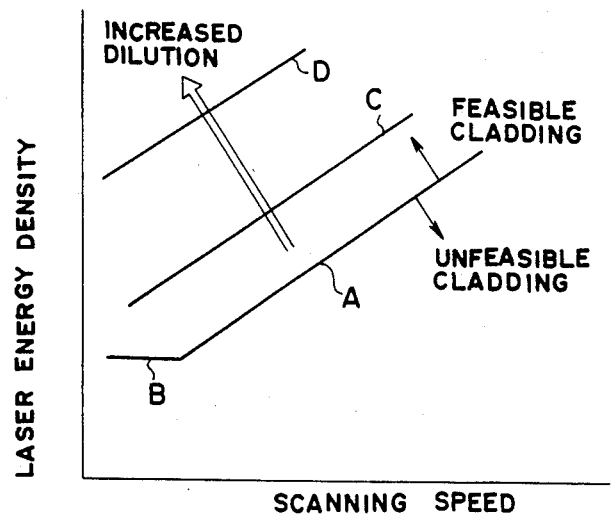
FIG. 5 diagrammatically shows cladding feasibility in relation to laser cladding conditions.

Laser cladding requires an amount of heat input above a certain limit because cladding cannot be accomplished with an amount of heat input which is too small to fully melt the powder cladding alloy. As the heat input is increased beyond the limit, not only the powder cladding alloy, but also the underlying portion of the body are melted whereby the cladding layer is diluted with the body material. The amount of heat input depends on the power density and scanning speed of a laser beam applied for cladding. The quality of cladding and degree of dilution are diagrammatically shown in FIG. 5 as a function of cladding conditions. On the right lower side of lines A and B in FIG. 5, a lacking amount of heat input renders cladding unfeasible. Cladding is feasible on the left upper side of lines A and B. As departing from these lines to the left upper direction, the amount of heat input increases to enhance the dilution of the cladding layer with iron from the body material. Lines C and D represent a heat input corresponding to an iron dilution of 5% and 15% respectively. The heat input should fall within a region encompassed between lines C and D in the practice of the present invention.

In order that the cladding layer be undiluted as described in the afore-mentioned Earle at al. U.S. patent, the heat input must be limited to near the minimum level above which cladding is feasible. More particularly, parameters approximate to lines A and B should be chosen among the left upper region of lines A and B in FIG. 5. When the heat input is set at a value approximate to the minimum level, the body portion is not substantially melted, often leaving slack bonding sites where the cladding layer remains not fully bonded to the body. The 5-15 wt % dilution with iron from the body material suggests that the heat input is so high that even the underlying portion of the body is melted, ensuring to prevent slack bonding from remaining between the cladding layer and the body. When the heat input is set at a value approximate to the minimum level of feasible cladding as mentioned above, cladding conditions are largely affected by variations in the cladding alloy powder delivery, shielding gas flow, valve body rotation and positioning precision, with the likelihood that even slight variations in parameters cause such defects as slack bonds. When an amount of heat significantly larger than the minimum level of feasible cladding is supplied so as to achieve a degree of dilution of 5-15 wt. % Fe as proposed in the present invention, the heat amount has a sufficient margin to absorb some variations in parameters, preventing occurrence of such defects as slack bonds.

With respect to pinholes in the cladding layer, less pinholes form in laser cladding than in gas cladding because the laser cladding generally provides a higher force of agitation to molten metal pool and directional solidification. With a less amount of heat input causing no dilution of the cladding layer, the molten metal pool is not fully agitated because of a lack of molten pool holding time, and a less amount of gas can escape from the molten metal pool because of an increased cooling-/solidifying rate. Thus more or less pinholes form inevitably. With a relatively large amount of heat input to achieve a degree of dilution of 5-15 wt. % Fe, the molten metal pool is fully agitated and the cooling/solidifying rate is relatively slow to allow more gas to escape from the pool, minimizing formation of pinholes.

Attack to the mating member will be described. Stellite often used as cladding alloy is of alloy design with the most attention paid to abrasion resistance. Since the cooling/solidifying rate is significantly high in carrying out laser cladding with a minimized amount of heat, a ultrafine microstructure forms and oversaturated solid-solution hardening occurs, resulting in a Stellite cladding layer which has a higher hardness than available in gas cladding and exhibits an undesirably high attack to the mating member. Dilution with 5-15 wt. % of iron moderately reduces the hardness of the Stellite cladding layer at little sacrifice of abrasion resistance, providing a mitigated attack to the mating member. Thermal shock resistance is improved over Stellite as such by diluting it with 5-15 wt. % of iron.

Cracks sometimes occur in a laser cladding process because of its quick thermal cycle. Particularly when the heat amount is set at the minimum level of feasible cladding as mentioned above, cooling and solidifying take place at such a high rate that cracks often occur. In a usual practice, pre- or post-heating is carried out to prevent cracking. The process according to the present invention relies on a relatively slow cooling/solidifying rate to minimize the probability of crack occurrence in cooperation with an improved thermal shock resistance due to dilution with the iron from the parent material. Cracking can thus be avoided without pre- or post-heating.

Dilution of the cladding layer with less than 5 wt. % of the iron from the parent material is insufficient to prevent occurrence of slack bonds, resulting in an increased slack bonding rate. Also, the intended effects are achieved to an undesired extent including pinhole suppression, attack of Stellite to the mating member, and thermal shock resistance. When the dilution of the cladding layer with the iron from the parent material exceeds 15 wt. %, the diluted alloy exhibits a reduced hardness, for example, a Vickers hardness Hv of less than 400 for Stellite commonly used as the cladding alloy, and hence, a reduced abrasion resistance. For this reason, the degree of dilution is limited to the range of 5 to 15% by weight of iron.

The cladding layer, whose thickness varies as viewed in the cross section of FIG. 2, has a thickness in the range of 0.3 to 0.7 mm at the thickest region. A maximum thickness of less than 0.3 mm is sometimes insufficient for durability. A maximum thickness in excess of 0.7 mm brings no problem in performance, but economy.

The interface layer between the cladding layer and the body, a transition where the composition varies from the parent material to the diluted cladding material has a thickness which varies depending on laser cladding conditions. Although the interlayer thickness cannot be definitely limited, it is generally up to about 0.1 mm, and most often ranges from about 0.04 to 0.06 mm.

Figure 6:
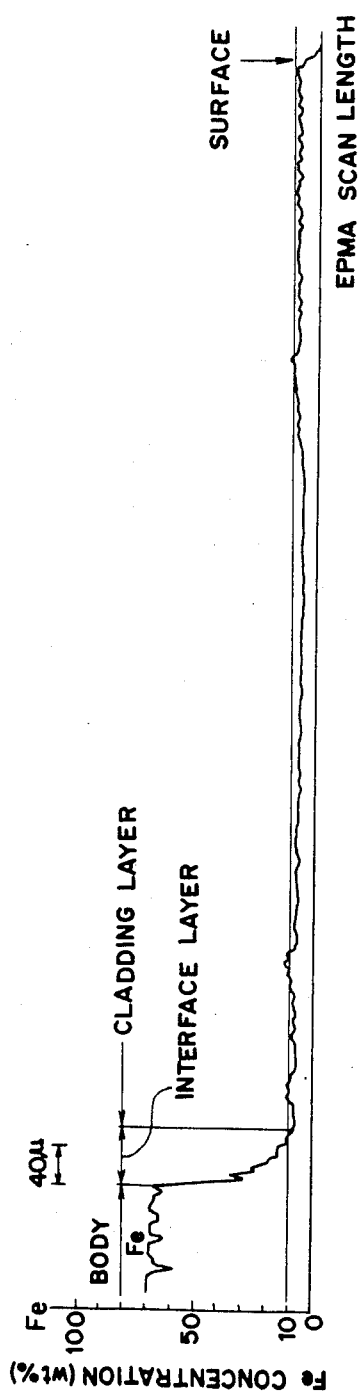
FIG. 6 is a diagram showing the profile of iron concentration near a valve face portion of one example of the clad valve according to the present invention as measured by EPMA analysis.

FIG. 6 is a diagram showing the profile of iron concentration near the cladding layer of one exemplary laser clad valve as determined by electron probe x-ray microanalysis (EPMA). The parent material used was an austenite heat-resistant steel consisting of in percent by weight, 0.3-0.5% C, 8.0-10.0% Mn, 20-22% Cr, 3.5-4.5% Ni, 0.05-0.50% Mo, 0.30-0.50% N, 0.10-1.0% W, 0.05-0.5% Nb, 0.05-0.50% V, balance of Fe, less than 0.50% Si, and less than 0.30% Cu. The cladding alloy used was Stellite No. 32 whose composition is previously set forth. Laser cladding was carried out using $CW-CO_2$ laser at a laser output of 2.5 kilowatts, a power density of 150 watts/mm$^2$, an energy density of 70 joule/mm$^2$, and a scanning speed of 450 mm/min. The thus obtained cladding layer had an iron concentration which fell in the range of about 7 to 10% throughout its thickness as seen from FIG. 6.

Figure 7:
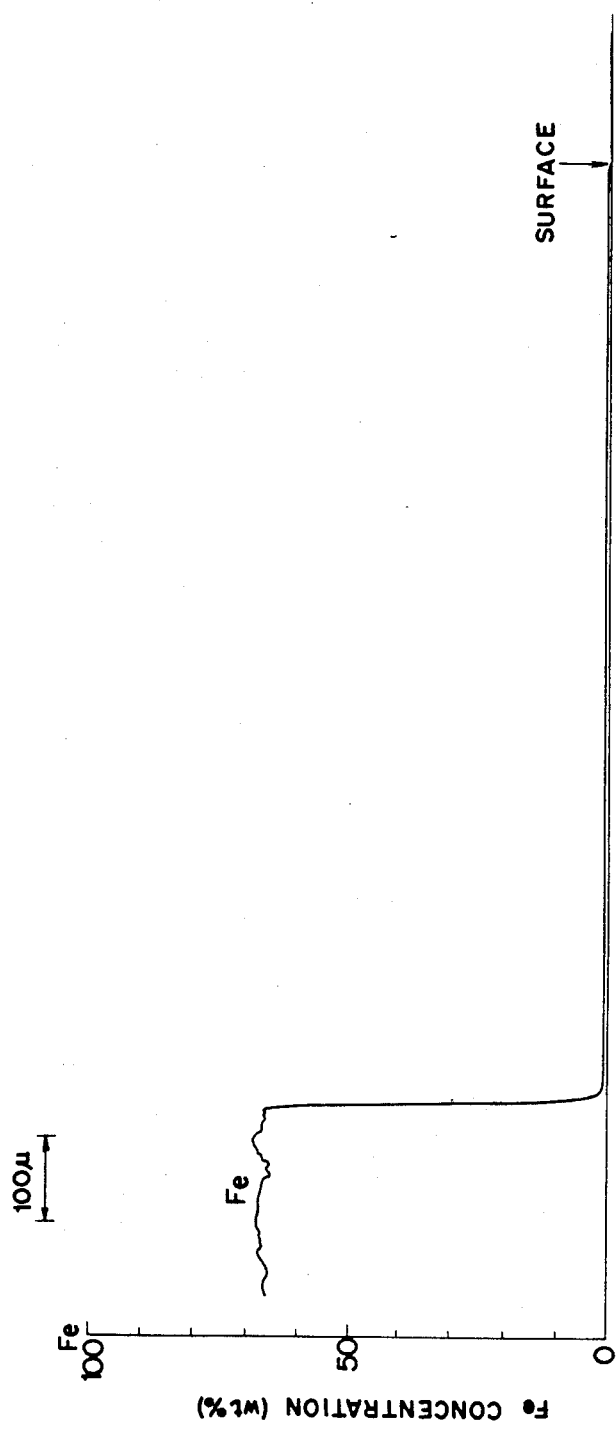
FIG. 7 is a diagram showing the profile of iron concentration near a valve face portion of one example of a clad valve without dilution of the cladding layer as measured by EPMA analysis.
Figure 8:
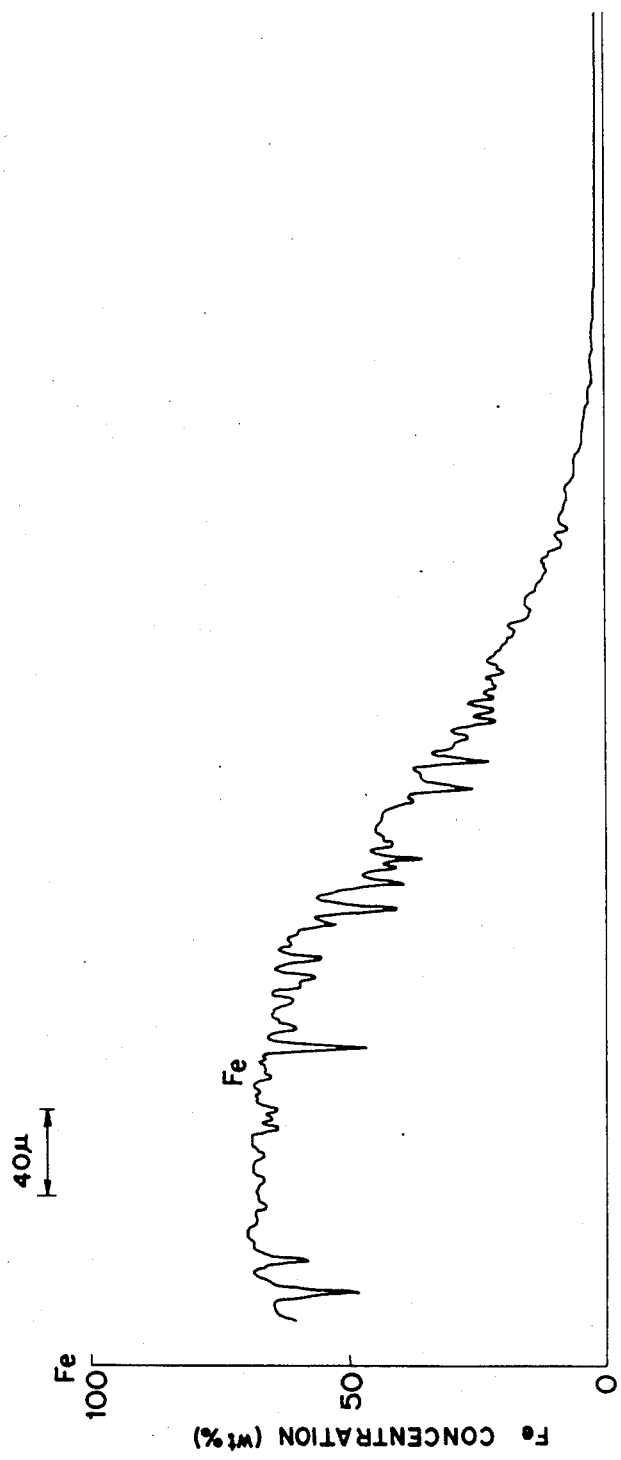
FIG. 8 is a diagram showing the profile of iron concentration near a valve face portion of one example of a conventional gas clad valve as measured by EPMA analysis.

For comparison purposes, a laser clad valve was prepared according to the teaching of Earle et al. U.S. patent so as not to substantially dilute the cladding layer with the iron of the parent material. The profile of iron concentration near the cladding layer of this laser clad valve was determined by EPMA analysis and shown in FIG. 7. A clad valve was also prepared using an oxygen-acetylene gas welding technique. The iron concentration profile of this clad valve as determined by EPMA is shown in FIG. 8. In either case, the parent material and cladding alloy used were the same as used in the laser clad valve of FIG. 6. The laser cladding conditions used in the preparation of the valve of FIG. 7 included a laser output of 1.8 kilowatts, a power density of 105 watts/mm$^2$, an energy density of 45 joule/mm$^2$, and a scanning speed of 450 mm/min.

Figure 9:
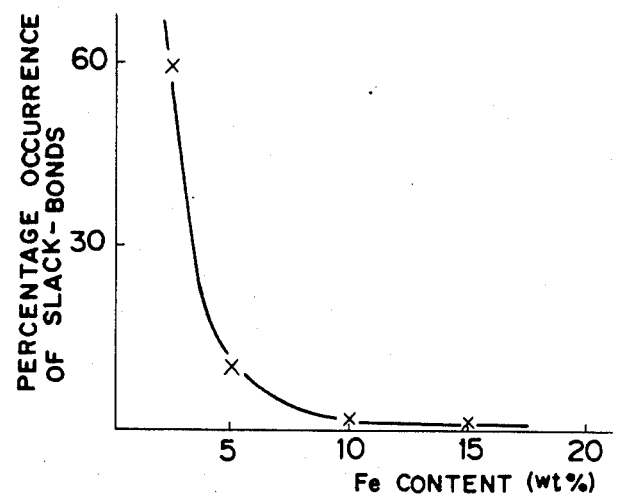
FIG. 9 is a graph showing the percentage slack bond in the cladding layer as a function of the amount of iron diffused therein.

The amount of iron diffused from the parent material to the cladding layer (or degree of dilution of the cladding layer with iron from the parent material) changes by a choice of laser cladding conditions. FIG. 9 is a diagram in which the percentage occurrence of slack bonds between the cladding layer and the parent material is plotted as a function of the amount of iron diffused. The parent material and cladding alloy used were the same as used in the laser clad valve of FIG. 6. It is evident from FIG. 9 that the percentage occurrence of slack bonds drastically decreases when the amount of iron diffused is increased to 5% or higher.

Figure 10:
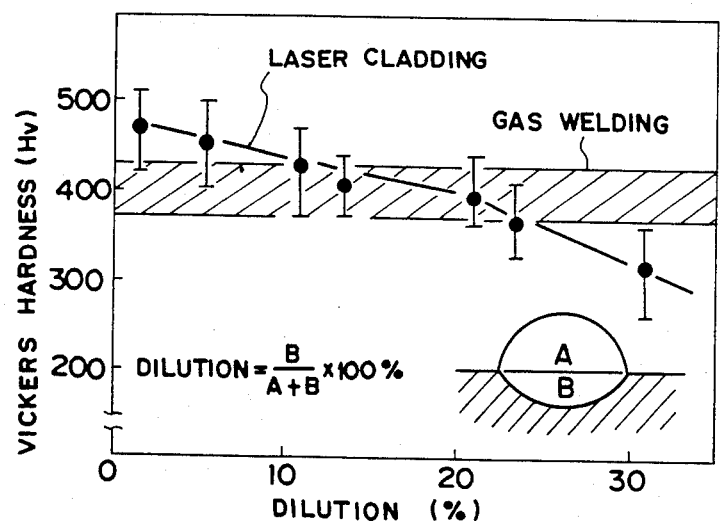
FIG. 10 is a graph showing the hardness of the cladding layer as a function of the degree of dilution.

The degree of dilution of the cladding layer with iron from the parent material is varied by changing laser cladding conditions. FIG. 10 shows how the hardness of the cladding layer varies with the degree of dilution. The laser cladding conditions used covered a laser output of 2 to 3 kilowatts, a power density of 120 to 200 watts/mm$^2$, an energy density of 50 to 250 joule/mm$^2$, and a scanning speed of 150 to 600 mm/min. The materials used are the same as used in the valve of FIG. 6. The hardness of the cladding layer formed by the gas cladding technique is also shown in FIG. 10 for which the degree of dilution is not particularly considered. The degree of dilution is expressed as $A/(A+B) \times 100\%$ wherein A is the cross-sectional area of powder alloy melted and B is the cross-sectional area of a melted portion of the parent material. The degree of dilution is substantially equal to the amount of iron in weight percent diffused from the parent material to the cladding layer.

As seen from FIG. 10, as the cladding layer formed of Stellite No. 32 cladding alloy is diluted with the iron from the parent material, the hardness of the cladding layer lowers and reaches the level of the gas cladding at a degree of dilution of 20%. It indicates that a cladding layer of the desired hardness can be produced by controlling the degree of dilution. Since Hv 400 is the minimum Vickers hardness to provide the necessary abrasion resistance, degrees of dilution of up to 15% offer the necessary abrasion resistance.

Figure 11:
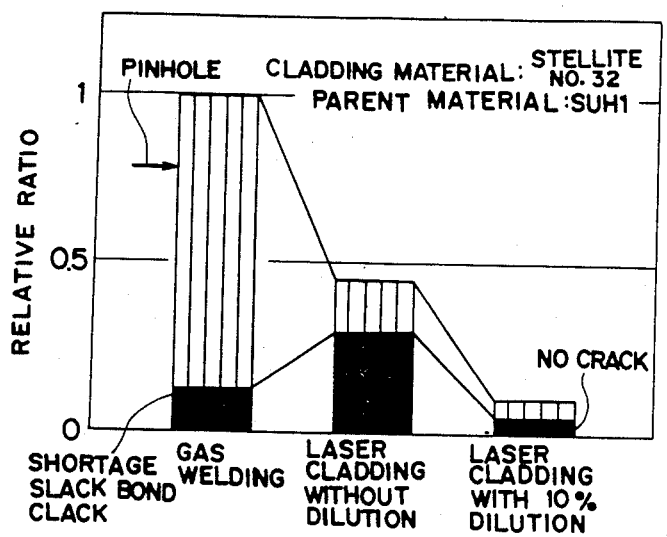
FIG. 11 is a graph showing the occurrence of defects in the cladding layer for a laser clad valve according to the present invention in comparison with a conventional gas clad valve and a known laser clad valve without dilution of the cladding layer.

Various valves were prepared using Stellite No. 32 as the cladding alloy and SUH 3 (according to JIS Standard) as the parent material by gas cladding with pre- and post-heating, laser cladding without dilution, and laser cladding with dilution to a degree of about 10%. The rate of occurrence of various defects is plotted in FIG. 11 as a relative ratio based on a rate of occurrence of unity (1) for gas welding. The gas welding used a mixture of oxygen and acetylene gas. The laser cladding without dilution used a laser output of 1.8 kilowatts, a power density of 125 watts/mm$^2$, an energy density of 44 joule/mm$^2$, and a scanning speed of 550 mm/min. The laser cladding with 10% dilution used a laser output of 2.5 kilowatts, a power density of 173 watts/mm$^2$, an energy density of 66 joule/mm$^2$, and a scanning speed of 500 mm/min.

Many pinholes formed and slack bonding and meltdown occurred in the gas welding. In the case of the laser cladding without dilution, significantly less pinholes formed than in the gas welding, but slack bonding frequently occurred. More specifically, the laser cladding without dilution showed a defect occurrence rate of 3% for crack, 5% for shortage, and 12% for slack bonding (with data overlapping). The laser cladding with 10% dilution invited much less pinholes and little defects like slack bonds.

Figure 12:
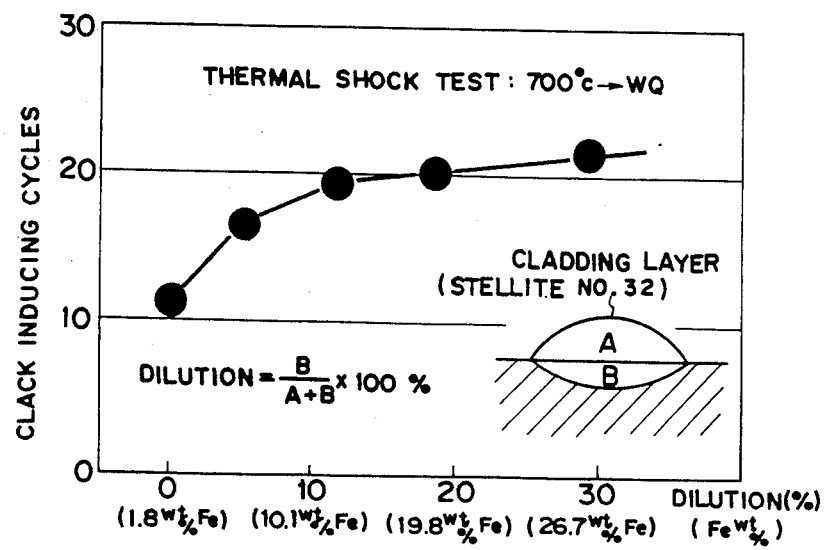
FIG. 12 is a graph showing the crack inducing cycle number in a thermal shock test as a function of the degree of dilution of the cladding layer.

FIG. 12 shows the results of a thermal shock test on a laser cladding layer as a function of the degree of dilution of the cladding layer with the parent material, the cladding layer being prepared using SUH 3 (according to JIS Standard) as the parent material and Stellite No. 32 as the cladding alloy. The thermal shock test was carried out by repeating thermal cycles each consisting of heating at 700° C. in an air atmosphere oven and quenching with water at 20° C. and determining the number of cycles until a crack occurred. The crack was observed by color checking. It is evident from FIG. 12 that fully improved thermal shock resistance results from a degree of dilution of 5% or higher.

The performance of the laser clad valve of the present invention was evaluated with the following results.

Figure 13:
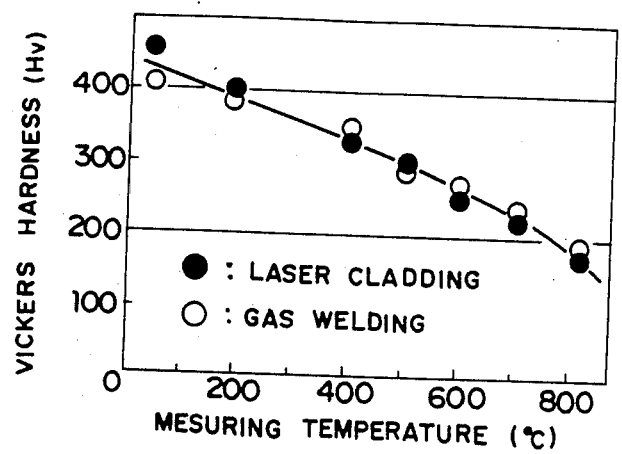
FIG. 13 is a graph showing the hardness of the cladding layer at high temperatures for a laser clad valve of the present invention and a conventional gas clad valve.

FIG. 13 shows the high-temperature hardness of a laser clad valve prepared by laser cladding to a degree of dilution of the cladding layer of about 10% using SUH 3 parent material and Stellite No. 32 cladding alloy as well as a gas clad valve using the same materials. The high-temperature hardness of a sample is determined by heating the sample at a varying temperature of 100° to 800° C., applying a load of 5 kg to the sample for a time of 10 seconds in an argon gas atmosphere, and measuring the Vickers hardness of the sample at five points at each temperature. As seen from FIG. 13, the laser clad valve and the gas clad valve are equivalent with respect to high-temperature hardness.

Figure 14:
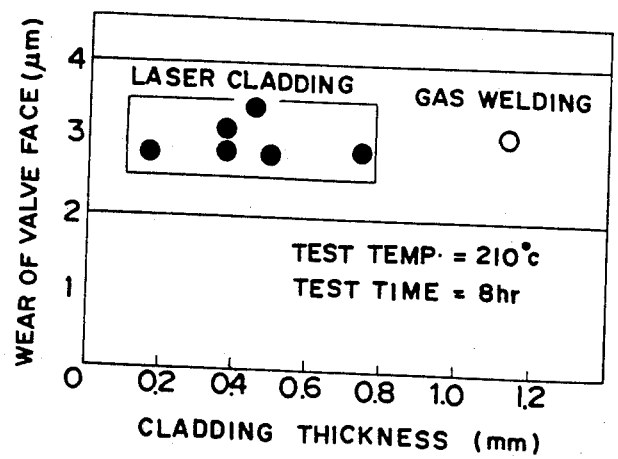
FIG. 14 is a graph showing the wear in thickness of the valve face in a valve abrasion test as a function of a cladding layer thickness.

Various laser clad valves were prepared by laser cladding to a degree of dilution of the cladding layer of about 10% using SUH 3 parent material and Stellite No. 32 cladding alloy while the thickness of the thickest portion of the cladding layer was varied from 0.1 to 1.2 mm. An accelerated strike and slide abrasion test was carried out by operating the valve in combination with a valve seat. The results are shown in FIG. 14. The accelerated abrasion test used a speed of the valve seating on the valve seat approximately 10 times the actual speed. The test was carried out by striking the valve against the seat at a rate of 2150 beats/min., a valve rotation of 1-5 r.p.m., a valve face temperature of 210° C. (heated with a propane gas burner) in an ambient atmosphere for 8 hours. At the end of the test, the removal of material from the valve face was determined in thickness ($\mu$m). As evident from FIG. 14, the abrasion resistance does not significantly depend on the thickness of the cladding layer. The valve prepared by laser cladding to a 10% dilution had equivalent abrasion resistance to the gas clad valve.

Figure 15:
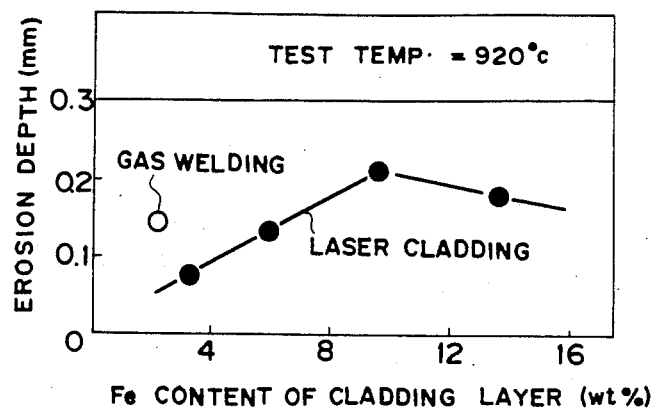
FIG. 15 is a graph showing the result of a PbO corrosion test as a function of the iron content of the cladding layer.

In FIG. 15, for the cladding layers formed of Stellite No. 32 cladding alloy, the depth of erosion of the cladding layer in a PbO erosion test was plotted as a function of the amount of iron in the cladding layer. The PbO erosion test was carried out by embedding the laser clad valve in PbO powder, heating at 920° C. for one hour in an oven, and thereafter determining the depth of erosion of the cladding layer. The depth of erosion increases with the amount of iron in the cladding layer, but to an extent substantially equal to that with the gas clad valve.

Figure 16:
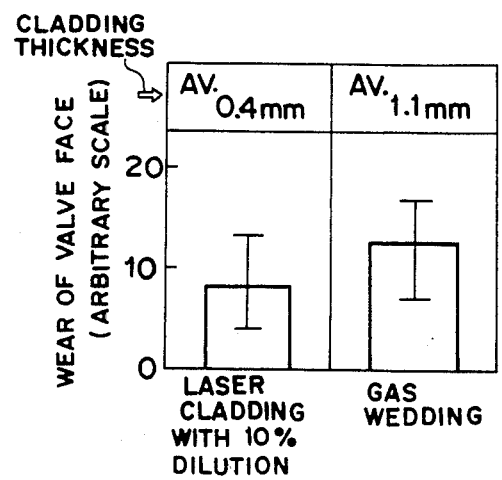
FIG. 16 is a graph showing the result of a durability test of a clad valve in an engine.

It is understood from the foregoing performance tests that the laser clad valve having a cladding layer with a degree of dilution of about 10% exhibits substantially equivalent performance to the gas clad valve. The valve was further evaluated by a commercial engine test or durability test, with the results shown in FIG. 16. The engine durability test was carried out by incorporating a laser clad valve prepared by laser cladding of Stellite No. 32 cladding alloy to a degree of dilution of about 10% in an exhaust port of a gasoline engine, and operating the engine at 6,000 r.p.m. for 200 hours using leaded gasoline as the fuel. The wear in thickness of the valve face was determined and compared with that of the gas clad valve of the same materials. The exhaust gas temperature in the test was 820°-860° C. The result is an average of 8 samples for each valve. It is evident from FIG. 16 that the laser clad valve exhibits abrasion resistance equal to or more than the gas clad valve even when it is practically operated in a commercial engine. At the end of the engine test, the valve of the present invention maintained a good valve face free of corrosion.

As described above, the laser clad valve of the present invention has a good profile of product quality including minimized defects in the cladding layer, particularly, minimized unbonding, and least pinholes. The present invention can provide an engine valve having a good compromise of mating member attack and abrasion resistance as a result of proper control of the hardness of the cladding layer. The laser clad valve of the present invention maintains its performance substantially unchanged with any thickness of the cladding layer, exhibits satisfactory durability even with a thickness of up to one half of that of the gas clad valve with an economic benefit of a reduced material cost, and prevents cracking even through cladding not preceded by pre-heating, with an additional benefit of reducing the cost of manufacturing process.

We claim:

1. A valve comprising a valve body of an iron base material and a valve face portion, said valve face portion comprising a cladding layer of an alloy having higher abrasion resistance and heat resistance than said iron base material and an interface layer between said cladding layer and said valve body, said valve face portion having been formed by a process of laser cladding which diffuses iron from said iron base material throughout a thickness of said cladding layer in an amount of 5 to 15% by weight of said cladding layer, and forms and iron content of said interface layer which continuously decreases across a thickness of said interface layer from an iron content of said iron base material at said valve body to an iron content of said cladding layer at said cladding layer.

2. The valve of claim 1 wherein said cladding layer has a maximum thickness in the range of 0.3 to 0.7 mm.

3. The valve of claim 1 wherein said interface layer has a thickness of up to 0.1 mm.

4. The valve of claim 1 wherein said cladding layer is of an alloy selected from nickel and cobalt base superalloys.

5. The valve of claim 1, wherein said cladding layer is of a Stellite alloy.

* * * * *